United States Patent
Fridberg et al.

[11] Patent Number: 5,988,720
[45] Date of Patent: *Nov. 23, 1999

[54] WHEEL HAVING A HUB AND A RIM WITH AN INTERFERENCE FIT THEREBETWEEN

[75] Inventors: Arkady Moiseevich Fridberg, Bataiskiy Poezd, 41-176, Moscow, Russian Federation, 109144; Leonid Vladimirovich Vinnik, Moscow, Russian Federation

[73] Assignees: Arkady Moiseevich Fridberg; Leonid V. Vinnik, both of Moscow, Russian Federation

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,659
[22] PCT Filed: Jun. 23, 1995
[86] PCT No.: PCT/RU95/00135
 § 371 Date: Dec. 30, 1996
 § 102(e) Date: Dec. 30, 1996
[87] PCT Pub. No.: WO96/01188
 PCT Pub. Date: Jan. 18, 1996

[30] Foreign Application Priority Data

Jul. 1, 1994 [RU] Russian Federation ............. 94022342

[51] Int. Cl.$^6$ ........................................................ B60B 37/12
[52] U.S. Cl. ............................................... 295/10; 295/18
[58] Field of Search ................................... 295/1, 10, 15, 295/18, 31.1, 32, 44, 45, 21

[56] References Cited

U.S. PATENT DOCUMENTS

| | | | |
|---|---|---|---|
| 50,579 | 10/1865 | Harris | 295/1 |
| 70,560 | 11/1867 | Harris | 295/10 |
| 180,247 | 7/1876 | Levake | 295/10 X |
| 276,211 | 4/1883 | Baldwin | 295/10 |
| 448,683 | 3/1891 | Silverthorn | 295/18 |
| 509,409 | 11/1893 | Totten | 295/18 |
| 570,525 | 11/1896 | West | 295/18 |
| 1,104,562 | 7/1914 | Slattery | 295/18 |
| 1,346,756 | 7/1920 | Lewis | 295/10 |

FOREIGN PATENT DOCUMENTS

| | | | |
|---|---|---|---|
| 34549 | 2/1886 | Germany | 295/15 |
| 705616 | 5/1941 | Germany | 295/21 |
| 22012 | of 1904 | United Kingdom | 295/10 |
| 1954 | of 1912 | United Kingdom | 295/10 |
| 153200 | 11/1920 | United Kingdom | 295/10 |

*Primary Examiner*—Russell D. Stormer
*Attorney, Agent, or Firm*—Birch, Stewart, Kolasch & Birch, LLP

[57] ABSTRACT

A wheel set with independent and combined rotation of the running surfaces of the wheels, of use as a driving axle of a transport device, e.g. an underground railway car. It comprises an axle 1 and wheels having hubs 2 rigidly connected to the axle 1. The running surface of one wheel is formed on a rim rigidly connected to the hub. The running surface 3 of the other wheel is formed on a rim 4 connected to the hub with possibility of rotation. The rim is connected to the hub via smooth surfaces of rotation, e.g. cylindrical surfaces 5 or conical surfaces 6. Parameters of the connection such as the diameter, roughness, hardness, or material are chosen subject to the condition that the torque defined by the frictional forces at the connection in a state of rest is greater than the torque applied to the axle when the transport device starts. During the process of motion, the torque decreases and the rim 4 can rotate relative to the hub, so that the wheels rotate at different angular speeds, e.g. at places where the track bends.

16 Claims, 1 Drawing Sheet

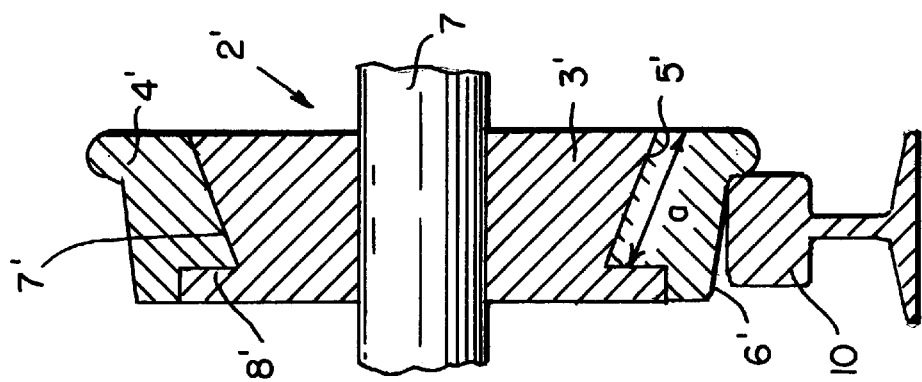
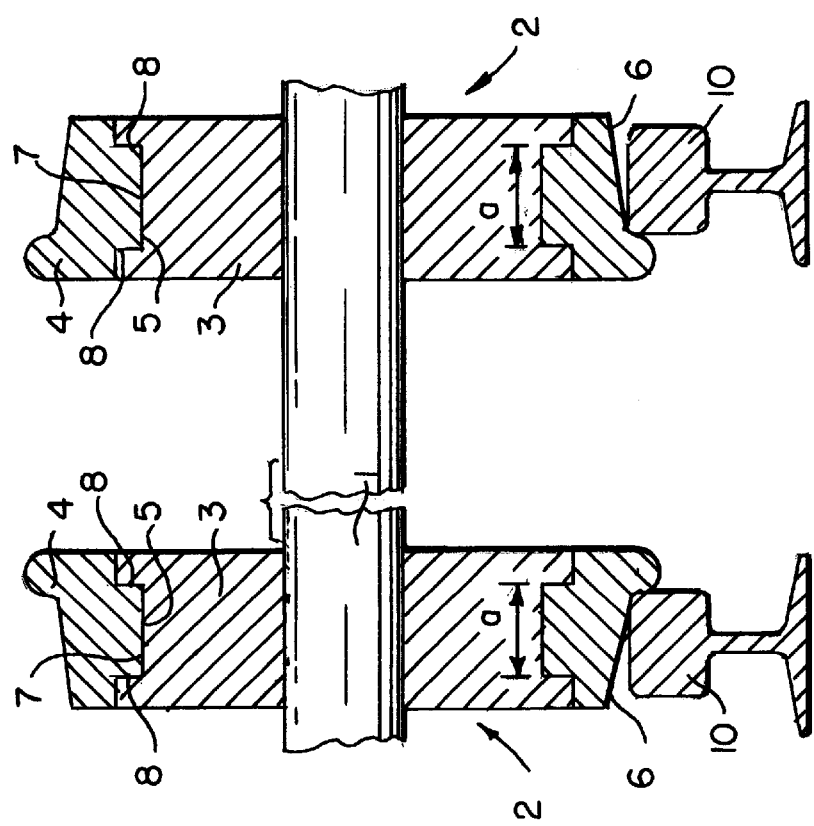

WHEEL HAVING A HUB AND A RIM WITH AN INTERFERENCE FIT THEREBETWEEN

SECTOR OF THE ART

The invention relates to transport mechanical engineering, more specifically to wheel sets of transport devices

BACKGROUND OF INVENTION

Widely-known wheel sets comprise an axle and wheels, the rims of which are rigidly connected to the axle whereas the running surfaces are formed on rims rigidly connected to hubs.

When the known wheel set is used, the wheels cannot move at different angular speeds, and this results in increased wear on the running surfaces of the wheels and the rails and also increases the consumption of energy.

There is also a known set with a friction slip limiter, wherein one wheel is rigidly connected to the axle whereas the other is connected to the axle via bushes and a front friction clutch adjusted to a limiting torque. (SU, No. 1782776, Int. Cl. B60B 39/14). In this wheel set, owing to the constant compressive force of the front friction clutch, there is low efficiency in equalizing the angular speeds of the wheels, and the wheel set operates only on a rail track with a very small radius of curvature, which limits its range of usefulness.

In addition, the wheel set has a complicated construction and is complicated in use.

The wheel set nearest in technical nature to the applied-for invention comprises an axle and wheels having their hubs rigidly connected to the axle whereas the running surfaces are formed on rims, one of which is rigidly connected to the hub whereas the other is connected thereto with possibility of rotation (DE, No. 3740140, Int. Cl. B60B 19/00).

The distinguishing feature of this wheel set is that the rim is connected to the hub via worm gears and control drives, fitted in the wheel. This greatly increases the complexity of the construction of the set, owing to the need for a system of control of drives, connected to transducers disposed along the track of the transport device.

SUMMARY OF THE INVENTION

The invention is based on the problem of constructing a wheel set for a transport device wherein the connecting unit between the hub and the rim is changed so as automatically to reduce the resistance to motion of the transport device and simultaneously simplify the construction of the wheels and increase the reliability of the wheel set, and also reduce the wear on the running surfaces of the wheels and the rail.

To this end, in the wheel set of a transport device according to the invention, the inner surface of the rim and the surface in contact therewith are in the form of surfaces of rotation, and the parameters of the rim and the hub are chosen such that the torque defined by the frictional forces in the zone of contact between the surfaces is very near the torque applied to a wheel of the set when it moves from its position and travels.

The shape of the surfaces in contact, i.e. two surfaces of rotation, increases the coefficient of friction compared with the coefficient of friction between the wheel and the rail.

In addition, contact along the surfaces of rotation enables the inevitable slip to be transferred from the area of contact between the wheel and rail to the internal zone of the wheel, which can be made of wear-resistant material and with set friction parameters.

BRIEF DESCRIPTION OF THE DRAWINGS

The invention will now be disclosed in detail in a description with reference to the accompanying drawings, in which:

FIG. 1 is a view in section of is a view in section of a wheel in accordance with the present invention, and FIG. 2 is a view in section of a wheel in accordance with the present invention.

The best embodiment of the invention.

A wheel set comprises an axle 1 (FIG. 1) and wheels 2. The hub 3 of each wheel 2 is rigidly connected to the axle 1, and the rim of one wheel 2 is connected to the hub 3 with possibility of rotation, and the inner surface 5 of the rim 4 and the surface 7 of the hub 3 in contact therewith are in the form of surfaces 5, 7 of rotation, e.g. cylindrical as shown in FIG. 1. The parameters of the surfaces 5, 7 i.e. the diameter, roughness, hardness and the materials of the rim and hub, are chosen so that the torque defined by the forces of friction in the contact zone "a" between the said surfaces 5, 7 of the rim 4 and the hub 3 is very near or equal to the torque applied to the wheel 2 of the set when it moves off and travels.

The rim 4 is formed with a running surface 6 adapted to interact with a rail 10.

The hub 3 has end surfaces 8 for preventing the rim 4 from flying off.

FIG. 2 shows a wheel of a set having conical surfaces 5 of rotation. Elements similar between FIGS. 1 and 2 have been distinguished in FIG. 2 by the addition of a prime symbol.

As an example one may use a wheel set whose radius of rotating surfaces 5 is more than half the radius of the running surface 6 of the wheel, the friction coefficient fluctuates from 0.1 to 0.3; the surfaces of the wheels in contact are made of wear-resistant materials used in all friction drives, and lubricant may also be used.

The end surfaces 8 are made of anti-friction material with use of lubricant.

The wheel set operates as follows. When the transport device begins to move, the drive begins to rotate the axle 1 of the wheel set, together with the hub 3 of the wheel 2 and the rim 4. Since the torque between the surfaces 5 of the rim 4 and the hub 3, under the action of the weight of the transport device, at that moment is greater than or equal to the torque transmitted by the drive to the axle 1, the rim 4 will rotate together with the hub 3 like a single whole and the transport device will begin to move as if on wheel pairs with rims rigidly connected to the hubs. As the speed increases, the wheel pair will be able to drive the running surfaces 6 of the wheels 2 in rotation at different angular speeds. During travel around bends on the track, the rim 4 rotates relative to the hub 3 and compensates the difference in the angular speed of the wheels. If the diameters of the rims 4 of the wheel set are different, the effect will be the same.

The result is significantly to reduce the wear on the wheels of the transport device and the rails and also to reduce losses of energy, owing to the reduction in the resistance to the motion of the transport device.

The embodiment of the invention described hereinbefore does not exclude the possible use of other variant embodiments, without departing from the scope of the applied-for technical solution.

Industrial Application

The wheel set is most successfully used in railway transport.

I claim:

1. A wheel for a transport device, said wheel comprising a hub having a circumferential outer contacting surface and being adapted for rigid connection to an axle of a transport device and a rim being mounted on said hub such that said rim is capable of rotation relative to said hub, said rim comprising a running surface for contacting a rail and an inner contacting surface that contacts said outer contacting surface of said hub, wherein said outer contacting surface of said hub and said inner contacting surface of said rim are provided in the form of complementary surfaces of rotation such that said inner contacting surface contacts substantially entirely said outer contacting surface, said inner contacting surface and said outer contacting surface having parameters of hardness and roughness that are selected such that, in use, when the wheel starts off and travels, the frictional torque between said inner contacting surface and said outer contacting surface that arises from the reaction to the weight of the transport device across the interface between said inner contacting surface and said outer contacting surface is very near to the torque applied to the wheel.

2. The wheel as claimed in claim 1, wherein said hub further comprises a radial end surface for retaining the rim thereon.

3. The wheel as claimed in claim 2, wherein said end surfaces are made of anti-friction materials.

4. The wheel as claimed in claim 1, wherein each of said inner surface and said surface of said hub is formed of wear-resistant material.

5. The wheel as claimed in claim 1, wherein said inner surface and said surface of the hub are conical.

6. The wheel as claimed in claim 1, wherein the coefficient of friction between said inner surface and said surface of the hub is 0.1 to 0.3.

7. The wheel as claimed in claim 1, wherein the radius of said inner surface is greater than half the radius of said running surface.

8. A wheel as claimed in claim 1, wherein said inner contacting surface and said outer contacting surface are cylindrical.

9. A wheel set for a transport device, said wheel comprising an axle and wheels; each of said wheels comprising a hub having a circumferential outer contacting surface and which that is rigidly connected to an axle of a transport device and a rim that is mounted on said hub such that said rim is capable of rotation relative to said hub, said rim comprising a running surface for contacting a rail and an inner contacting surface that contacts said outer contacting surface of said hub, wherein said outer contacting surface of said hub and said inner contacting surface of said rim are provided in the form of complementary surfaces of rotation such that said inner contacting surface contacts substantially entirely said outer contacting surface, said inner contacting surface and said outer contacting surface having parameters of hardness and roughness that are selected such that, in use, when the wheel starts off and travels, the frictional torque between said inner contacting surface and said outer contacting surface that arises from the reaction to the weight of the transport device across the interface between said inner contacting surface and said outer contacting surface is very near to the torque applied to the wheel.

10. The wheel set as claimed in claim 9, wherein each said hub further comprises a radial end surface for retaining the rim thereon.

11. The wheel set as claimed in claim 10, wherein each of said rim surfaces is made of anti-friction material.

12. The wheel set as claimed in claim 9, wherein each of said inner surface and said surface of said hub is formed of wear-resistant material.

13. The wheel set as claimed in claim 9, wherein said inner surface and said surface of said hub are conical.

14. The wheel set as claimed in claim 9, wherein the coefficient of friction between said inner surface and said surface of the hub is 0.1 to 0.3.

15. The wheel set as claimed in claim 9, wherein the radius of said inner surface and said surface of said hub is greater than half the radius of said running surface.

16. A wheel as claimed in claim 9, wherein said inner contacting surface and said outer contacting surface are cylindrical.

* * * * *